Aug. 14, 1956   W. R. WAYMIRE ET AL   2,758,863
GATE LATCH
Filed April 12, 1955   2 Sheets-Sheet 1
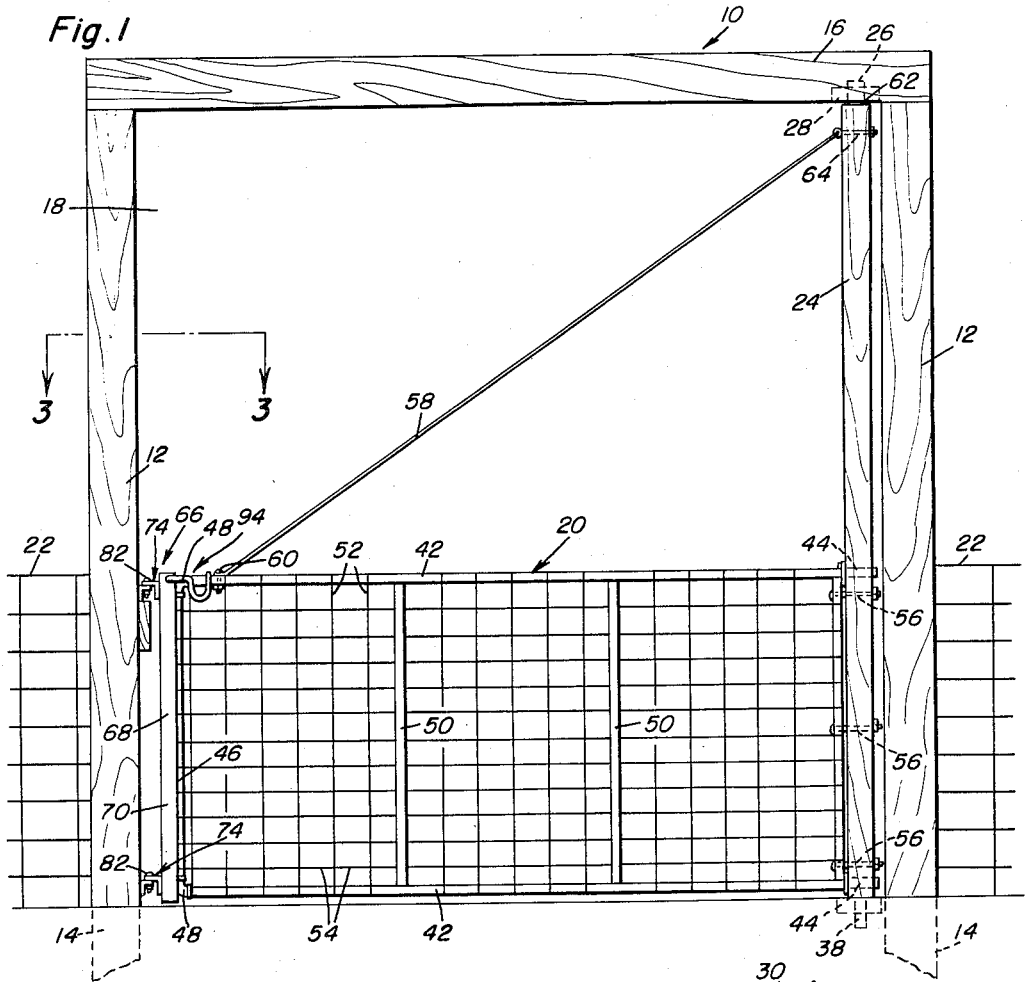
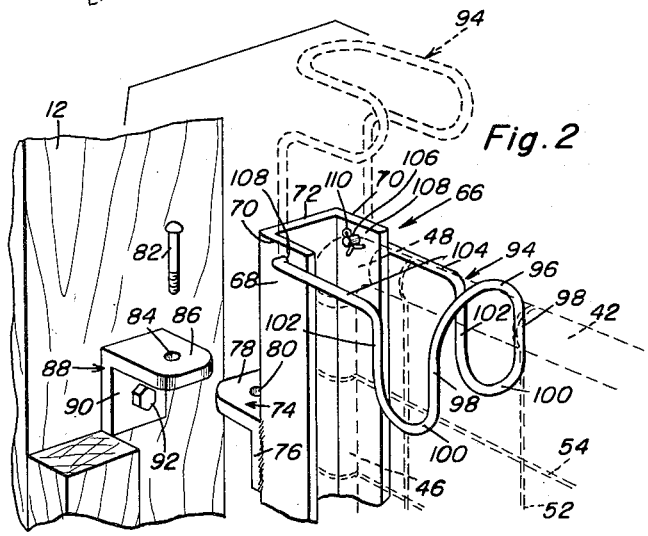
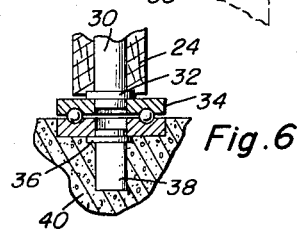
Walter R. Waymire
Alice P. Walker
    INVENTORS,
BY Clarence A. O'Brien
and Harvey B. Jacobson
            Attorneys

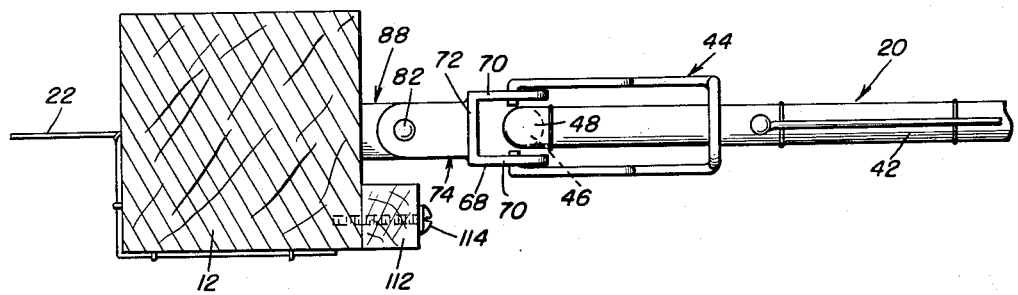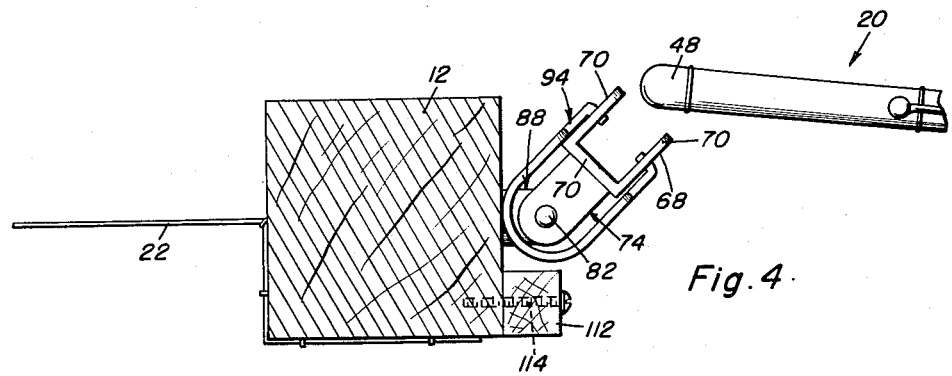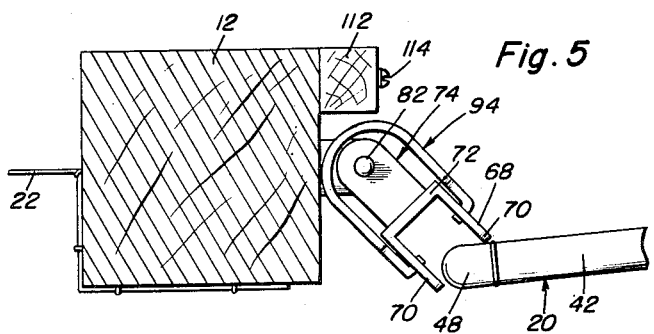
Walter R. Waymire
Alice P. Walker
INVENTORS

United States Patent Office 2,758,863
Patented Aug. 14, 1956

2,758,863

GATE LATCH

Walter R. Waymire and Alice P. Walker,
Whitmore, Calif.

Application April 12, 1955, Serial No. 500,825

1 Claim. (Cl. 292—216)

This invention relates generally to fence structure, and is more particularly directed to a gate latch which is utilized with oversized gates designated as "farm-gates" or those gates which are used for fencing around factory buildings.

Accordingly, a primary object of the invention in conformance with that set forth above is to provide in a relatively large gate structure a readily operable and relatively simply constructed gate latch mechanism which permits the ready opening and closing and retaining in position of a gate of relatively large size.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front elevational view of a relatively large gate incorporating the novel gate-latch structure;

Figure 2 is an enlarged exploded perspective view illustrating a fragmentary portion of the support and novel gate-latch mechanism;

Figure 3 is an enlarged top elevational view of a portion of the gate and gate latch structure wherein the gate is retained in a closed position;

Figure 4 is a view similar to Figure 3 illustrating the position of the gate latch structure and gate when open;

Figure 5 is a bottom plan view illustrating the gate latch and gate when the gate is open; and Figure 6 is a further enlarged fragmentary sectional view of a portion of the bearing support for the gate.

Indicated generally at 10 is a generally U-shaped gate construction including vertical support members 12 anchored in a support surface indicated at 14 and having extending thereacross at their top portions a transverse header member 16. The members 12 and 16 define the opening indicated generally at 18 through which the ingress and egress will be controlled by the gate 20 to be subsequently described. Secured to the vertical members 12 opposite their opening 18 is conventional fencing indicated at 22.

The gate assembly 20 includes a vertical pivotal support member 24 having a reduced diameter portion 26 supported in a suitable journal 28 in the lower surface of the transverse member 16. As seen in Figure 6, the pivotal support member 24 has secured in the lower portion thereof a shaft 30 having an annular flange 32 which rests upon a suitable bearing construction 34, said bearing construction 34 resting upon an annular flange 36 of a stub shaft 38 which is suitably supported in the support surface indicated at 40, said surface may be concrete as indicated.

The gate assembly 20 also includes a pair of horizontal frame members 42 having their ends 44 suitably secured in the pivotal support member 24, and pivotal therewith, the opposite ends of the horizontal frame members 42 being secured to a vertical end member 46 by means of conventional elbow elements 48. Intermediately positioned between the horizontal frame members 42 are vertical brace members 50, and the gate frame covered by suitably secured vertical and horizontal wire portions 52 and 54, respectively, which are suitably secured adjacent vertical pivotal support member 24 by means of tension hook elements indicated at 56. Extending upwardly from the top horizontal frame member 42 adjacent the vertical end member 46 is the end 60 of an angular bracing member 58 which has its opposite end secured by means of a bolt assembly 64 adjacent the top end portion 62 of the vertical pivotal support member 24.

The gate latch assembly is indicated generally at 66 and includes an elongated U-shaped channel bar element 68 including sides 70 connected by a rear bight portion 72. The described lock or hook 94 forms a yoke vertically swingable into and from straddling relation to the top horizontal frame member 42. The bight portion 72 has secured thereon opposite the side 70 in any suitable manner vertically spaced pivot brakets 74 including a vertical leg 76 and a horizontal portion 78 having a central pivotal aperture 80. Extending through the aperture 80 is a pivot pin 82 for extension through a similar aperture 84 contained in a pivot bracket 88 mounted on the inner surface of vertical support member 12 by means of its vertical leg 90 which is secured thereto by means of a suitable fastener indicated at 92.

The lock or hook member on the gate latch is indicated generally at 94 and comprises a single elongated member including a forward bight portion 96 connecting a pair of downwardly extending leg portions 98 adapted to extend on either side of the top horizontal member 42. Said leg portions 98 terminate in rearwardly extending bight portions 100 which terminate in upwardly extending portions 102 parallel to the leg portions 98, said leg portions 102 terminating in rearwardly extending arms 104 which have inwardly directed bent ends 106 which are secured within apertures 108 contained in the upper end portion of the side walls 70 of the latch element 68, said ends being secured therein by means of cotter pins 110, for example.

A stop block 112 may be secured by means of a suitable fastener 114 in the pivotal paths of the elongated latch element 68 to prevent excessive pivotal movement thereof in a given direction to prevent the gate from opening toward the stop element 112.

As clearly seen in Figures 2 through 5, the gate 20 is readily secured in the elongated latch element 68 by means of the cooperation of the end member 46 between the side 70, the latch or lock member 94 extending down over the top of the top horizontal member 42. Pivoting the lock member 94 upwardly in position shown by the dotted lines of Figure 2, permits the pivoting of the gate opposite or away from the stop element 112, the latch element 68 readily pivoting on its hinge bracket 74 out of the way of the pivotal movement of the gate.

Thus it is believed readily apparent that there has been disclosed a novel gate latch which fully conforms to the objects of invention heretofore set forth.

Various positional directional terms such as "front," "rear," "top," etc., are utilized herein to have only a relative connotation and are not intended to be interpreted as requiring any particular orientation of the device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A gate latch comprising a vertical channel bar having sides and a bight portion, and adapted to receive therein one end of a swingable gate, vertically spaced hinges fixed on the bight portion of said bar attachable to a gate post and on which said bar is swingable laterally in response to swinging of the gate to release an end of the gate received therein, a yoke member pivoted on the upper end of said bar and vertically swingable thereon into and from straddling relation to a top edge of the gate to prevent relative swinging of said bar and the gate, and a block member attachable to the gate post alongside said bar to block swinging of said bar in one direction.

References Cited in the file of this patent

UNITED STATES PATENTS

| | | |
|---|---|---|
| 626,180 | Marcum et al. | May 30, 1899 |
| 1,603,176 | Whiteford | Oct. 12, 1926 |

FOREIGN PATENTS

| | | |
|---|---|---|
| 108,683 | Australia | Sept. 27, 1939 |